(No Model.)

J. W. DUDLEY.
PISTON ROD PACKING.

No. 324,096. Patented Aug. 11, 1885.

WITNESSES:

INVENTOR:
J. W. Dudley
BY Munn & Co
ATTORNEYS.

UNITED STATES PATENT OFFICE.

JOHN W. DUDLEY, OF PORTLAND, OREGON.

PISTON-ROD PACKING.

SPECIFICATION forming part of Letters Patent No. 324,096, dated August 11, 1885.

Application filed April 23, 1885. (No model.)

*To all whom it may concern:*

Be it known that I, JOHN W. DUDLEY, of Portland, in the county of Multnomah and State of Oregon, have invented a new and Improved Piston-Rod Packing, of which the following is a full, clear, and exact description.

My invention relates to packings for piston-rods, valve-stems, and like parts of machinery, and has for its object to lessen wear on the piston-rod or valve-stem while maintaining a tight joint around it, and at the same time to allow the rod or stem a limited lateral play to accommodate imperfect alignment of the moving parts.

The invention consists in a composite packing comprising split metal rings having inclined meeting faces, causing their lateral expansion under pressure, and placed around the piston-rod or valve-stem, and a fibrous or equivalent elastic packing placed outside the metal packing-rings next the wall of the stuffing-box, all as hereinafter fully described and claimed.

Reference is to be had to the accompanying drawings, forming part of this specification, in which similar letters of reference indicate corresponding parts in all the figures.

Figure 1:
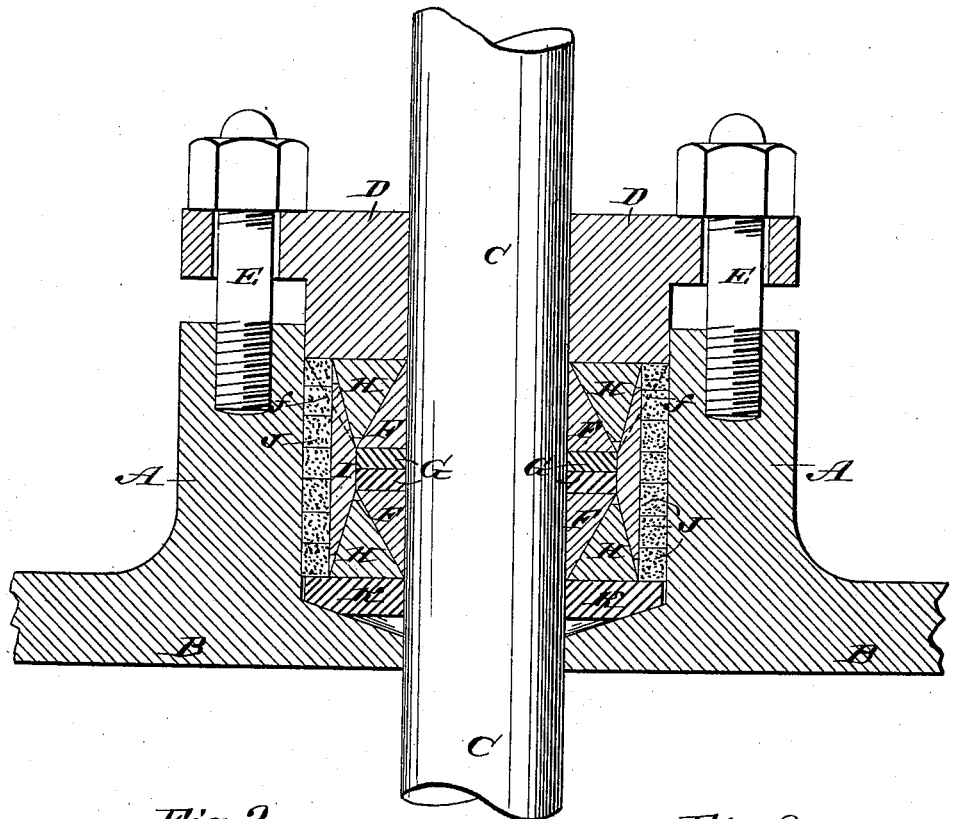
Figure 2:
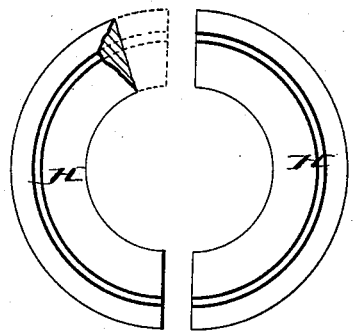
Figure 3:
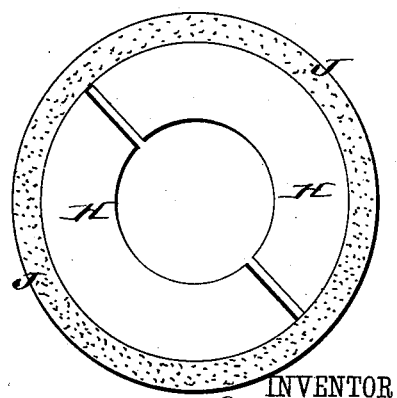

Figure 1 is a sectional elevation of a stuffing-box surrounding a piston-rod and with my improved composite packing applied. Fig. 2 is a face view of one of the split packing-rings partly broken away and in section, and Fig. 3 is an end view of the packing just inside of the gland or follower of the stuffing-box.

The letter A indicates the stuffing-box wall, formed as a flange on the end of a steam-engine cylinder, B, for instance, and through which the piston-rod C passes; and D indicates the gland or follower of the stuffing-box, which fits within the wall A, and is held to place by screw-bolts E in the usual manner.

The piston-packing comprises two split rings, F, made of brass or other suitable anti-friction metal, and having the cross-sectional shape of a right-angled triangle, or with straight inner sides which bear on the piston-rod C, and bases at right angles to the rod which face each other, and which when the stuffing-box is shallow will rest against each other, but when the stuffing-box is deep one, two, or more filling-out metal split-rings, G, will be placed between them, and outside of the split-rings F are placed the split-rings H H, having flat bases and two angular faces, one of which faces bears against the angular faces of the rings F, and their other angular faces bear against the reversely-beveled inner faces of a split metal ring, I, the outer face of which, preferably, is flat, so that the hemp or other fibrous packing material J may easily be wound around it before the composite metal and fibrous packing is placed in the stuffing-box.

If desired, the split metal ring F next the gland D may have such cross-sectional shape that its base inverted nearly fills the space between the piston-rod and the wall A of the stuffing-box, as indicated by the dotted lines *f f* in Fig. 1.

When the base of the stuffing-box bevels downward or inward toward the piston-rod, which may often be the case owing to the shape of the drill or tool used in boring out the box, I will first place in the stuffing-box the split ring K, to provide a flat surface on which the inner split ring H and fibrous packing J may rest fairly. (See Fig. 1.)

In applying the gland D over the packing the screws E will be tightened sufficiently to hold the packing to place, and not enough to tighten the packing fully upon the piston-rod, and the pressure of the steam or other fluid working in the cylinder will compress the packing endwise toward the gland and expand the packing laterally against the piston-rod and the wall of the stuffing-box to make a fluid-tight joint around the rod immediately as the piston begins to work in the cylinder, and when the operation of the piston ceases the packing will relax or yield, which gives the fibrous packing J a chance to expand again, so that its elasticity will the longer be preserved. This elastic quality of the packing, due to the use of the fibrous packing J with the anti-friction metal rings F H I, allows the piston-rod to have a limited side-play to accommodate itself to imperfect alignment of the moving parts without causing undue wear on the piston-rod or on the yielding metal packing-rings which surround it, which is an important advantage.

By the interposition of the ring I, with its inclined faces disposed next to the inclined faces of the ring H, and with its flat face arranged next to the fibrous packing, the movement of the parts is rendered uniform, and an unbroken continuous bearing is presented to the fibrous portion of the packing, while compactness and durability are promoted.

Another important feature of the composite, fibrous and metal packing is that the metal packing-rings do not require fitting against the wall of the stuffing-box, as when such rings fill the space within the box around the rod, thus saving time and labor in making the packing-rings and adjusting them to the stuffing-box.

I have particularly described the packing as applied to the piston-rod of an engine; but it may be applied in many situations—as, for instance, around valve stems or other moving rods or parts of machinery where stuffing-boxes are employed.

Having thus described my invention, I claim as new and desire to secure by Letters Patent—

1. A packing for piston-rods, valve-stems, &c., comprising split metal rings having inclined meeting faces, causing their lateral expansion under pressure, and placed around the piston-rod or valve-stem, and a fibrous or equivalent elastic packing placed outside the metal packing-rings, next to the wall of the stuffing-box, one of said rings having double inclined inner faces and an outer flat face furnishing an unbroken or continuous bearing for the inner surface of said fibrous packing, substantially as herein set forth.

2. A packing for piston-rods, valve-stems, &c., comprising split metal rings F H I, having inclined meeting faces causing their lateral expansion under pressure, and a fibrous packing, J, placed outside the ring I and next to the wall of the stuffing-box, and either with or without the metal rings G or K, substantially as herein set forth.

JOHN W. DUDLEY.

Witnesses:
C. W. TOWNSEND,
J. R. STODDARD.